US008839295B2

(12) United States Patent
Kim

(10) Patent No.: US 8,839,295 B2
(45) Date of Patent: Sep. 16, 2014

(54) METHOD OF PROVIDING CONTENT MANAGEMENT LIST INCLUDING ASSOCIATED MEDIA CONTENT AND APPARATUS FOR PERFORMING THE SAME

(75) Inventor: Dong Hwan Kim, Seoul (KR)

(73) Assignee: Humax Co., Ltd., Seongnam-si (KR)

( * ) Notice: Subject to any disclaimer, the term of this patent is extended or adjusted under 35 U.S.C. 154(b) by 3 days.

(21) Appl. No.: 13/544,707

(22) Filed: Jul. 9, 2012

(65) Prior Publication Data

US 2013/0036439 A1  Feb. 7, 2013

(30) Foreign Application Priority Data

Aug. 2, 2011 (KR) ........................ 10-2011-0076896

(51) Int. Cl.
*H04N 5/445* (2011.01)
*H04N 21/436* (2011.01)
*H04N 21/262* (2011.01)
*H04N 21/482* (2011.01)

(52) U.S. Cl.
CPC ... *H04N 21/26283* (2013.01); *H04N 21/43615* (2013.01); *H04N 21/4828* (2013.01); *H04N 21/4821* (2013.01)
USPC ......................................................... 725/40

(58) Field of Classification Search
CPC .................. H04N 21/26283; H04N 21/43615; H04N 21/4821; H04N 21/4828
USPC ......................................................... 725/40
See application file for complete search history.

(56) References Cited

U.S. PATENT DOCUMENTS 5,835,755 A * 11/1998 Stellwagen, Jr. ............. 707/764
5,913,210 A * 6/1999 Call ................................. 1/1
6,219,839 B1 * 4/2001 Sampsell ...................... 725/40
7,103,905 B2 * 9/2006 Novak .......................... 725/46
7,369,749 B2 * 5/2008 Ichioka et al. .............. 386/291
7,373,650 B1 * 5/2008 Rodriguez et al. ........... 725/41
7,493,639 B2 * 2/2009 Lawler et al. ................ 725/40
7,631,336 B2 * 12/2009 Diaz Perez ................. 725/109
2002/0065919 A1 * 5/2002 Taylor et al. ................ 709/226
2005/0108751 A1 * 5/2005 Dacosta ....................... 725/39
2005/0235321 A1 * 10/2005 Ahmad-Taylor ............. 725/56
2007/0192793 A1    8/2007 Song et al.
2009/0037954 A1 * 2/2009 Nagano ........................ 725/39
2009/0119708 A1 * 5/2009 Harrar et al. ................. 725/39

(Continued)

FOREIGN PATENT DOCUMENTS

KR   10-2009-0046160 A   5/2009

*Primary Examiner* — Nasser Goodarzi
*Assistant Examiner* — Michael B Pierorazio
(74) *Attorney, Agent, or Firm* — Birch, Stewart, Kolasch & Birch, LLP

(57) ABSTRACT

There are disclosed a method of providing a content management list which enables various contents to integrally used and managed and an apparatus for performing the same. A method of providing a content management list including associated media is performed by a content management list providing apparatus capable of accessing one or more local contents over a network and includes searching for information of an associated local content associated with a channel program included in Electronic Program Guide (EPG) information of a broadcasting program and displaying the searched information of the associated local content in such a way as to have an association with air time of the channel program of the content management list. Accordingly, a user can plan to use various contents more efficiently without the need to search for all available contents in order to directly check associated content and use the associated content.

13 Claims, 10 Drawing Sheets

(56) References Cited

U.S. PATENT DOCUMENTS

2009/0119712 A1    5/2009  Kim et al.
2009/0249394 A1*  10/2009  Schwesinger et al. .......... 725/39
2009/0320072 A1*  12/2009  McClanahan et al. ......... 725/47
2009/0327100 A1*  12/2009  Greenberg et al. ............ 705/27
2010/0281107 A1*  11/2010  Fallows et al. ................ 709/203
2010/0333137 A1    12/2010  Hamano et al.
2011/0283189 A1*  11/2011  McCarty ....................... 715/707
2012/0232684 A1*   9/2012  Lee ................................. 700/94
2012/0278825 A1*  11/2012  Tran et al. ...................... 725/13

* cited by examiner

METHOD OF PROVIDING CONTENT MANAGEMENT LIST INCLUDING ASSOCIATED MEDIA CONTENT AND APPARATUS FOR PERFORMING THE SAME

The present application claims priority to Korean patent application number 10-2011-0076896 filed on Aug. 2, 2011, the entire disclosure of which is incorporated by reference herein, is claimed.

BACKGROUND OF THE INVENTION

1. Field of the Invention

The present invention relates to content management and, more particularly, to a method of providing a content management list and an apparatus for performing the same.

2. Discussion of the Related Art

There are ongoing efforts for a Digital Living Network Alliance (DLNA) standardization to establish guidelines required to be observed for interoperability between various devices, such as home and office devices, and to authenticate whether the guidelines are observed or not. The DLNA enables interoperability between various devices, such digital AV devices or personal computers, over a home network, so that various contents, such as audios, videos, and still images, can be shared by the devices.

DLNA-authenticated devices can interoperate with one another over wired and/or wireless networks. According to DLNA, digital devices, such as home appliances, PCs, and wireless devices from different manufacturers, can share content over wired and/or wireless home networks based on Universal Plug and Play (UPnP).

Content can be shared by DLNA-authenticated terminals based on the characteristic of the DLNA. In order to search for content stored in one or more DLNA-authenticated terminals each including a storage region, a letter-based query word is transmitted, the DLNA-authenticated terminals search for content similar to the query word, and the content are shared between DLNA-authenticated devices over a home network.

Furthermore, IPTV for providing various contents, such as information, moving images, music, and broadcasting, over an ultrahigh speed Internet network has been commercialized as one type of digital convergence. Accordingly, a user can view only a desired program on the desired time, and content stored in a terminal can be directly played through various mobile terminals, such as smart phones, or can be played through streaming from a server on the Internet.

As described above, the number of content accessible to a user is explosively increased, and content can be played irrespective of devices because they are shared through the DLNA. Accordingly, from a viewpoint of a user, there is an urgent need for the convenient and efficient management of content.

An Electronic Program Guide (EPG) is being used as a representative application for providing information of digital broadcasting programs and managing the viewing or scheduled recording of a broadcast program. EPG information is guide information about various programs which are broadcasted through digital terrestrial broadcasting, IPTV broadcasting, or cable broadcasting, and it help a viewer to select a program and provides a function of displaying information about a program selected or scheduled by a user.

However, conventional EPGs provide only broadcasting information about each of the channels of digital terrestrial broadcasting, IPTV broadcasting, or cable broadcasting because the EPGs are specialized in digital terrestrial broadcasting, IPTV broadcasting, or cable broadcasting. Accordingly, the play, recording, and scheduled viewing of various contents interconnected through the DLNA or over wired and/or wireless networks cannot be managed through the conventional EPGs. Accordingly, there is a problem in that a user has to manage content provided through digital terrestrial broadcasting, IPTV broadcasting, or cable TV broadcasting through an EPG provided by relevant service, has to separately manage the play, recording, and schedule of other various contents, and has to directly select associated content from among enormous contents.

PRIOR ART DOCUMENT

Patent Document (Patent Document 1) Korean Patent Laid-Open Publication No. 10-2009-0046160 entitled "Method of Providing Multimedia Content List and Sub-list and Broadcasting Reception Apparatus Using The Same" by Samsung Electronics (May 11, 2009)

SUMMARY OF THE INVENTION

An object of the present invention is to provide a method of providing a content management list, which is capable of integrally managing the use and management of various contents and managing content play schedules more efficiently by displaying various contents with consideration taken of an association between relevant contents.

Another object of the present invention is to provide an apparatus for providing a content management list, which is capable of integrally managing the use and management of various contents and managing content play schedules more efficiently by displaying various contents with consideration taken of an association between relevant contents.

Technical objects of the present invention are not limited to the above-described object and other technical objects that have not been described above will become evident to those skilled in the art from the following description.

In accordance with an embodiment of the present invention, there is provided a method of providing a content management list including associated media in a content management list providing apparatus, including searching for information of associated local content associated with a channel program that belongs to EPG information of a broadcasting program and displaying the searched information of associated local content in such a way as to have an association with the air time of the channel program of the content management list. Here, searching for information of associated local content associated with a channel program that belongs to the EPG information of a broadcasting program includes generating metadata for the channel program and metadata for the one or more local contents, determining whether the channel program and the one or more local contents have an association according to a predetermined criterion based on the generated metadata, and selecting the searched information of associated local content according to a result of the determination. Here, displaying the searched information of associated local content in such a way as to have an association with the air time of the channel program of the content management list includes displaying the searched information of the associated local content in an EPG form on the time identical with the air time of the channel program of the content management list, if the channel program and the associated local content do not have a temporal order relationship. Here, displaying the searched information of associated local content in such a way as to have an association with the air time of the channel program of the content management list includes displaying the searched information of the associated local content in an EPG form before or after the air time of the channel program of the content management list, if the channel program and the associated local content have a temporal order relationship. Here, displaying the searched information of associated local content in such a way as to have an association with the air time of the channel program of the content management list includes generating a list including a plurality of the associated local content if the associated local content is plural and displaying the generated list in such a way as to have an association with the air time of the channel program of the content management list. Here, displaying the searched information of associated local content in such a way as to have an association with the air time of the channel program of the content management list includes displaying a channel program including associated local content in such a way as to be distinguishable from other channel programs, belonging to the EPG information, through a specific indication if the associated local content corresponds to the channel program. Here, displaying the searched information of associated local content in such a way as to have an association with the air time of the channel program of the content management list includes specifying a specific channel program, from among channel programs including associated local content, in response to an event signal corresponding to a key control signal generated by a key manipulation of a user and displaying an associated local content list, corresponding to the specified channel program, in such a way as to have a specific association with the air time of the channel program. Here, the content management list displays associated local content for one or more contents stored in the content management list providing apparatus, content stored in one or more devices connected to the content management list providing apparatus over a network, content interconnected through DLNA, and content playable over an Internet.

Furthermore, in accordance with another embodiment of the present invention, there is provided a content management list providing apparatus, including a communication unit for receiving EPG information and information of the one or more local contents over a wired or wireless network and providing the received information, a control unit for searching for information of associated local content associated with a channel program that belongs to the EPG information and performing control so that the searched information of associated local content is displayed in such a way as to have an association with the air time of the channel program of a content management list, and an output unit for outputting the EPG information and the searched information of associated local content in response to control of the control unit. Here, the control unit includes a metadata generation unit for generating metadata for the channel program and the one or more local contents obtained through the communication unit, an association determination unit for determining whether the channel program and the one or more local contents have an association according to a predetermined criterion based on the generated metadata, and an associated local content selection unit for selecting information of associated local content according to a result of the determination. Here, the control unit includes a display type selection unit for selecting a display type of the searched information of associated local content, and if the channel program and the searched associated local content do not have a temporal order relationship, the display type selection unit displays the searched information of associated local content in an EPG form on the time identical with the air time of the channel program of the content management list. Here, the control unit includes a display type selection unit for selecting a display type of the searched information of associated local content, and if the channel program and the searched associated local content have a temporal order relationship, the display type selection unit displays the searched information of associated local content in an EPG form before or after the air time of the channel program of the content management list. Here, the control unit includes a display type selection unit for selecting a display type of the searched information of associated local content, and if there is associated local content corresponding to the channel program, the display type selection unit displays the channel program including the associated local content in such a way as to be distinguishable from other channel programs belonging to the EPG information through a specific indication. Here, the control unit further includes an input unit for providing an event signal corresponding to a key control signal generated by a key manipulation of a user and a display type selection unit for selecting a display type of the searched associated local content, wherein the control unit specifies a specific channel program, from among channel programs including associated local content, in response to the event signal and displays an associated local content list, corresponding to the specified channel program, in such a way as to have a specific association with the air time of the channel program. Here, the associated local content is associated local content for the one or more contents stored in the content management list providing apparatus, content stored in one or more devices connected to the content management list providing apparatus over a network, content interconnected through DLNA, and content playable over an Internet.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION OF THE EMBODIMENTS

Figure 1:
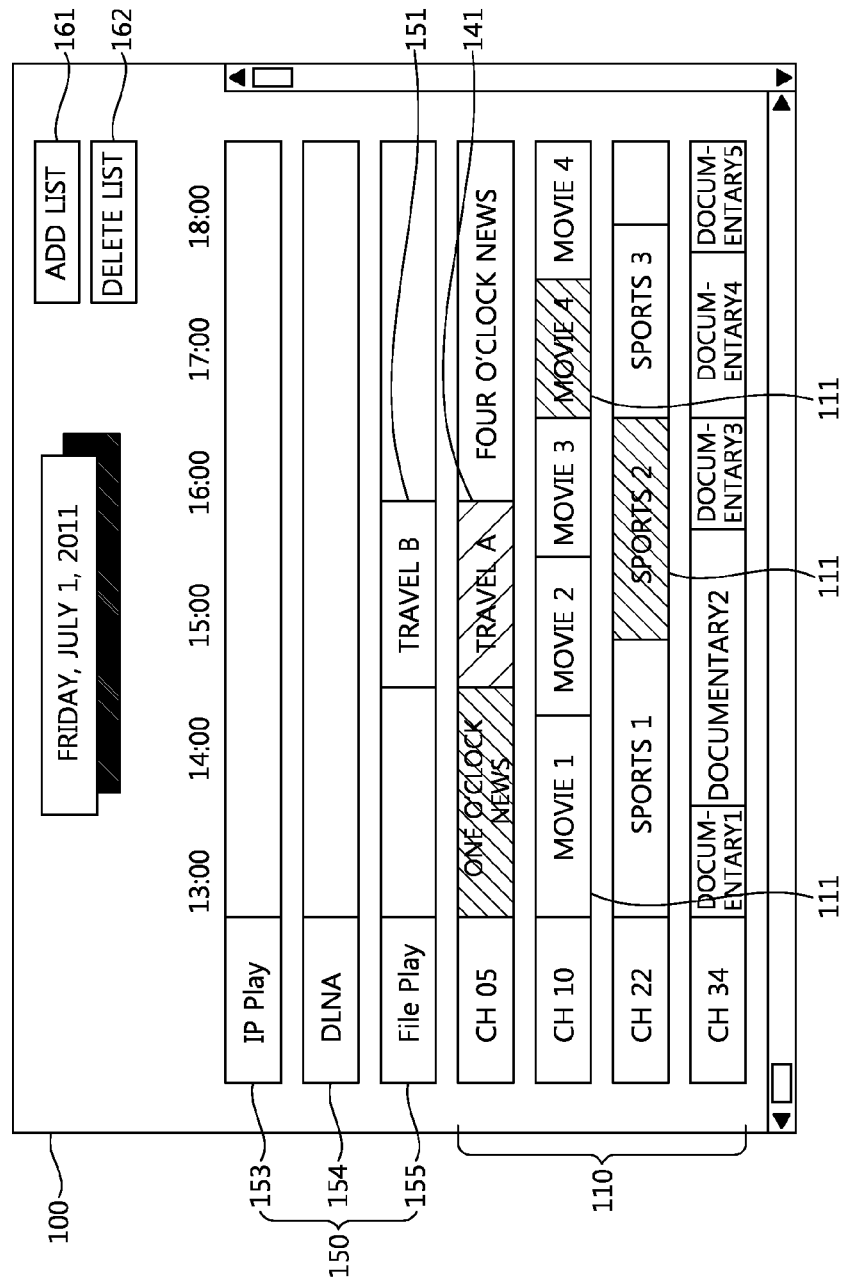
FIG. 1 is a conceptual diagram showing an example in which there is no relationship in temporal order between channel programs and associated local content in the configuration of a content management list according to an embodiment of the present invention.

The present invention may be modified in various ways and may have several embodiments. Specific embodiments of the present invention are illustrated in the drawings and described in detail in the detailed description.

However, the present invention is not intended to be limited to the specific embodiments, and it should be understood that the present invention includes all modifications, equivalents, or substitutions which fall within the spirit and technical scope of the present invention.

Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may be named a first element. A term, such as and/or, includes a combination of a plurality of pertinent and described items or any one of a plurality of pertinent and described items.

If one element is described to be "connected" or "coupled" to the other element, the one element may be directly connected or coupled to the other element, but it should be understood that a third element may exist between the two elements. On the other hand, if one element is described to be "directly connected" or "directly coupled" to the other element, it should be understood that a third element does not exist between the two elements.

The terms used in this application are used to only describe the specific embodiments and are not intended to restrict the present invention. An expression of the singular number includes an expression of the plural number unless clearly defined otherwise in the context. In this application, terms, such as "comprise" and "have", are intended to designate that characteristics, numbers, steps, operations, elements, or parts which are described in the specification, or a combination of them exist, and should be understood that they exclude the existence or possible addition of one or more other characteristics, numbers, steps, operations, elements, parts, or combinations of them in advance.

All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, preferred embodiments of the present invention will be described in detail with reference to the accompanying drawings. In describing the present invention, in order to help overall understanding, the same reference numerals designate the same elements throughout the drawings, and a redundant description of the same elements is omitted.

Terms used in this specification are described in detail below.

A channel program refers to a specific program included in EPG information, that is, per-time broadcasting information about each of a plurality of channels that is provided through digital terrestrial broadcasting, IPTV broadcasting, or cable TV broadcasting.

Local content collectively refers to content (file) stored in an apparatus for providing a content management list (hereinafter referred to as the content management list providing apparatus), content stored in one or more devices connected to the content management list providing apparatus over a network, content interconnected through DLNA (DLNA), and content (IP play) playable over the Internet.

FIG. 1 is a conceptual diagram showing an example in which there is no relationship in temporal order between channel programs and associated local content in the configuration of a content management list according to an embodiment of the present invention.

As shown in FIG. 1, a content management list 100 according to an embodiment of the present invention may integrally display information about a program for each of the channels of multi-channel digital broadcasting provided through digital terrestrial broadcasting or IPTV broadcasting, information 110 about programs scheduled to be viewed or recorded by a user, and pieces of information 150 about various local contents interconnected over a wired and/or wireless network.

More particularly, the content management list 100 displays per-time broadcasting information 110 about each of a plurality of channels provided through digital terrestrial broadcasting, IPTV broadcasting, or cable TV broadcasting and displays information about a specific program (e.g., a program title) scheduled to be viewed or recorded by a user, from among programs belonging to the per-time broadcasting information, so that the information about a specific program is distinguishable from other programs. For example, as shown in FIG. 1, the content management list 100 may display information 111 about a specific program scheduled to be viewed or recorded by a user in such a way as to be distinguishable from pieces of information about other programs through graphics and/or text.

The content management list 100 may further display information 151 of local contents associated with a channel program that belongs to EPG information of a broadcasting program, from among contents (File Play) stored in the content management list providing apparatus or stored in the local regions of various devices connected to the content management list providing apparatus in a wired and/or wireless manner, contents shared through DLNA (DLNA), and contents that are interconnected or playable over the Internet (IP Play).

If the channel program and the associated local contents does not have a temporal order relationship as in, for example, "World Tour on TV: French" and "World Tour on TV: England", the information of associated local content 151 may be displayed in an EPG form on the same time as the air time of a channel program 141 along the time axis of the content management list 100 as shown in FIG. 1.

If local content associated with a channel program that belongs to EPG information of a broadcasting program, from among contents (File Play) stored in local regions, contents shared through DLNA (DLNA), and contents (IP Play) that are interconnected or playable over the Internet, is plural, the associated local contents may be classified according to their types, the distinguished content types may be displayed using different local content items 153, 154, and 155, and the information of associated local content 150 may be displayed in such a way as to have a specific association with the air time of the channel program 141 along the time axis of each of the local content items 153, 154, and 155.

More particularly, as shown in FIG. 1, if the associated local content is plural, the content management list 100 according to the embodiment of the present invention displays contents (File Play) stored in the local regions of various devices interconnected over a network, contents shared through DLNA (DLNA), and contents (IP Play) that are interconnected or playable over the Internet in the form of different local content items 153, 154, and 155 and displays the information of associated local content 150 in an EPG form in such a way as to have a specific association with the air time of the channel program 141 along the time axis of each of the local content items 153, 154, and 155. Here, information of the local content displayed in the content management list 100 may include at least any one of a content name, a genre, a series name, a subtitle, order, a file name, a file position, a file size, a play time, and the type of file of the local content.

Furthermore, the content management list 100 may include a list addition command button 161 for adding schedules, such as the play, viewing, and recording of a specific program, and a list deletion command button 162 for deleting or cancelling already scheduled contents. If information about the display of the content management list 100 exceeds one screen, vertical and/or horizontal scroll tools may be automatically displayed.

As shown in FIG. 1, the content management list 100 according to the embodiment of the present invention integrates not only the pieces of information 110 about a digital terrestrial broadcasting, IPTV broadcasting, or cable TV broadcasting program, but also the pieces of information 150 of local contents associated with a channel program that belongs to EPG information of a broadcasting program, from among contents stored in the local regions of various devices, contents shared through DLNA, and contents playable over the Internet over a wired and/or wireless network and displays the pieces of integrated information in an EPG form in such a way as to have a specific association with the air time of the channel program 141 along the time axis of the content management list. Accordingly, a user may easily check the schedules of all contents, plan to use various contents more efficiently without the need to search for all available contents in order to check associated content, and use the associated content.

Figure 2:
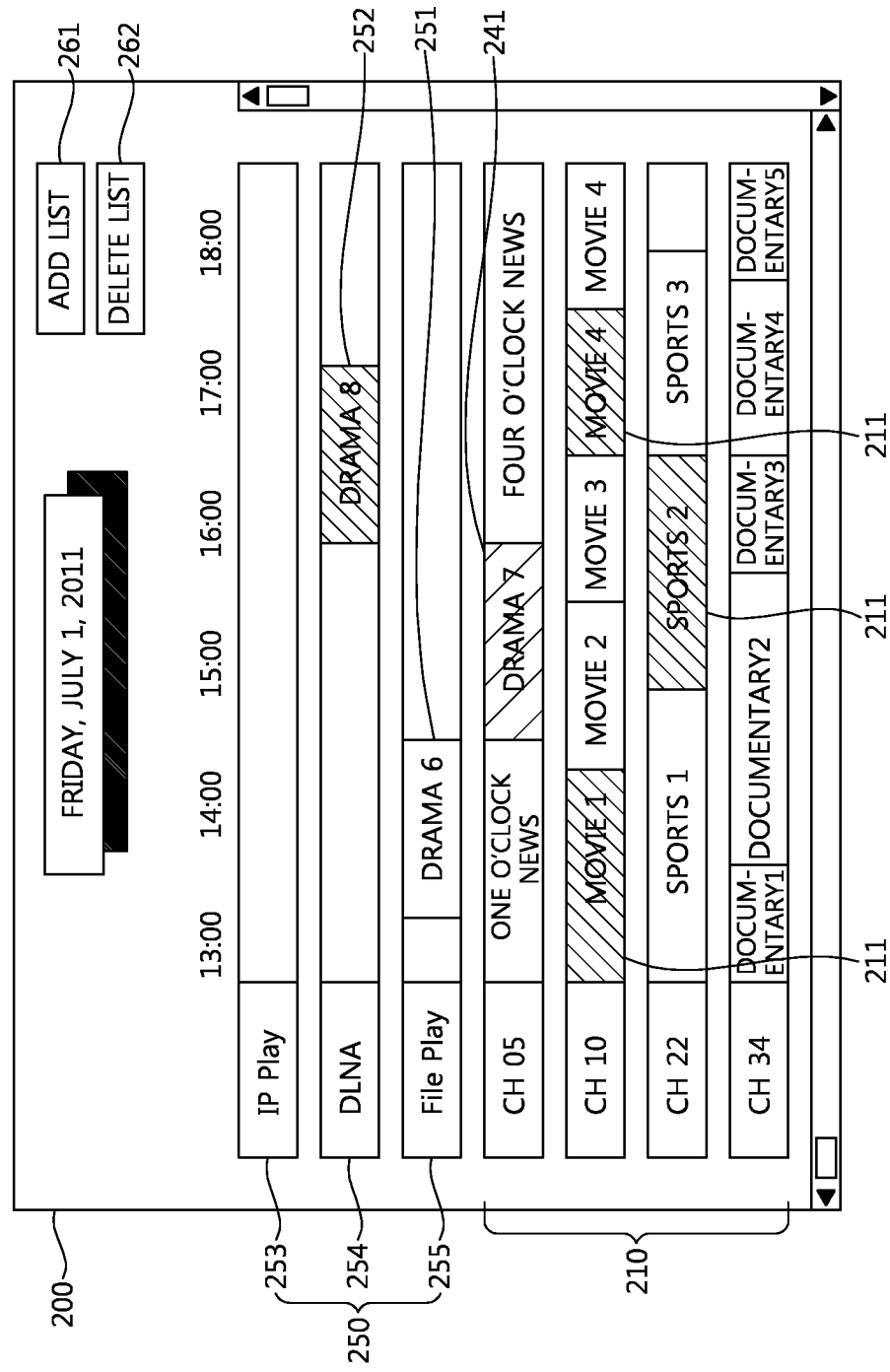
FIG. 2 is a conceptual diagram showing an example in which there is a relationship in temporal order between a channel program and associated local content in the configuration of a content management list according to an embodiment of the present invention.

FIG. 2 is a conceptual diagram showing an example in which there is a relationship in temporal order between a channel program 241 and associated local contents 251 and 252 in the configuration of a content management list 200 according to an embodiment of the present invention. The content management list 200 of FIG. 2 has almost the same configuration as the content management list 100 of FIG. 1, but differs from the content management list 100 in the positions where the associated local contents 251 and 252 are displayed along the time axis of the content management list 200.

If the channel program 241 and the associated locals content 251 and 252 have a temporal order relationship, for example, "Prison Brake7", "Prison Brake6", and "Prison Brake8", respectively, as shown in FIG. 2, when "Prison Brake6" is temporally anterior to the channel program 241, the content management list 200 may display information of the associated local content 251 in an EPG form before the air time of the channel program 241 along the time axis of the content management list 200. When "Prison Brake8" is temporally posterior to the channel program 241, the content management list 200 may display information of the associated local content 252 in an EPG form after the air time of the channel program 241 along the time axis of the content management list 200.

The pieces of displayed associated local content information 251 and 252 may need to be fixed and displayed on the time axis of the content management list through the scheduled play of the pieces of associated local content information 251 and 252 according to circumstances because the pieces of displayed associated local content information 251 and 252 are displayed in relation with an association with the channel program 241. The content management list 200 may display information of specific associated local content (e.g., 252) selected by a user, from among the displayed associated local contents, so that the specific associated local content 252 is distinguishable from other contents on the time axis displayed in the content management list 200. For example, as shown in FIG. 2, the content management list 200 may display information of the specific associated local content 252 selected by a user in such a way as to be distinguishable from other pieces of program information through graphics and/or text.

Figure 3:
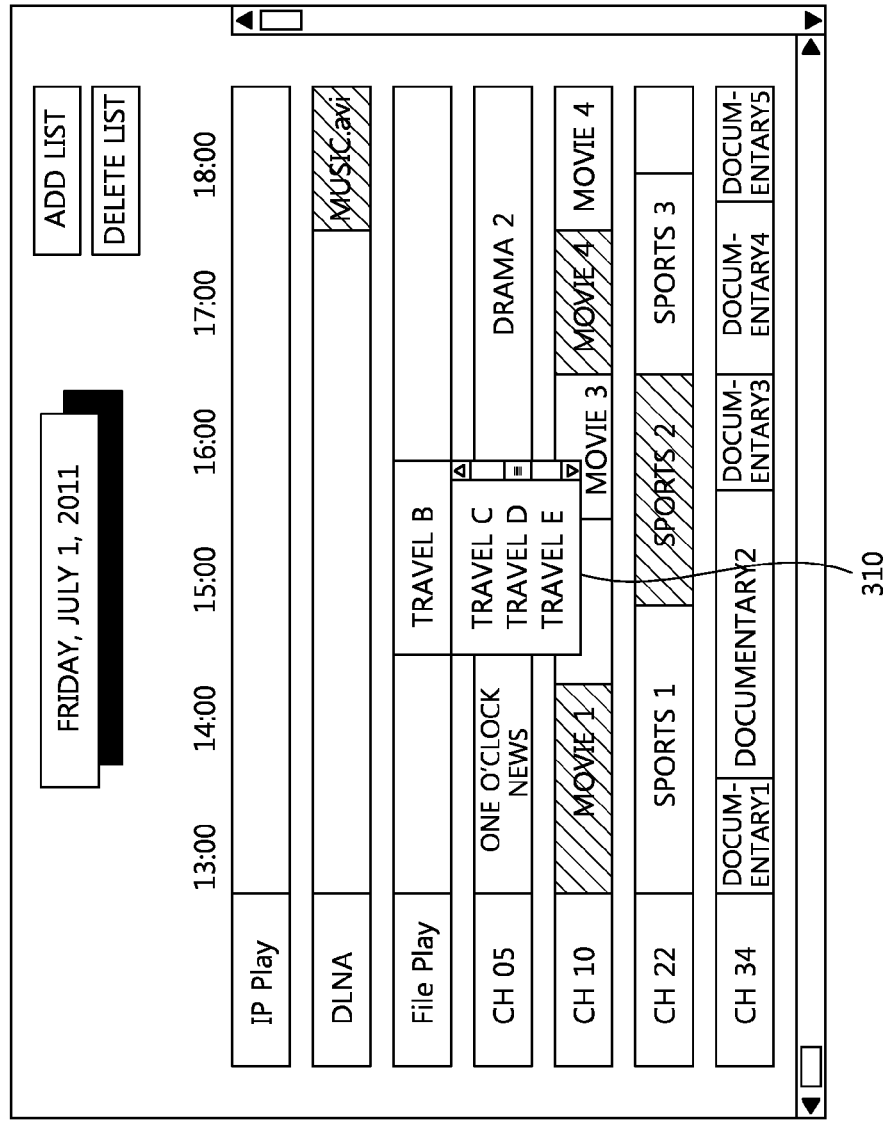
FIG. 3 is a conceptual diagram showing an example in which when there is a plurality of associated local content, a list including the plurality of associated local content is generated and displayed in the configuration of a content management list according to an embodiment of the present invention.

FIG. 3 is a conceptual diagram showing an example in which when there are a plurality of associated local contents, a list including the plurality of associated local contents are generated and displayed in the configuration of a content management list according to an embodiment of the present invention. Associated local content, from among far-reaching local content including contents (File Play) stored in the local regions, contents shared through DLNA (DLNA), and contents (IP Play) that are interconnected or playable over the Internet, may be plural. If the associated local content is plural, a list including a plurality of associated local contents may be generated so that an amount of information about the associated local contents may be displayed and an associated local content list 310 may be displayed through pop-up as shown in FIG. 3.

Figure 4:
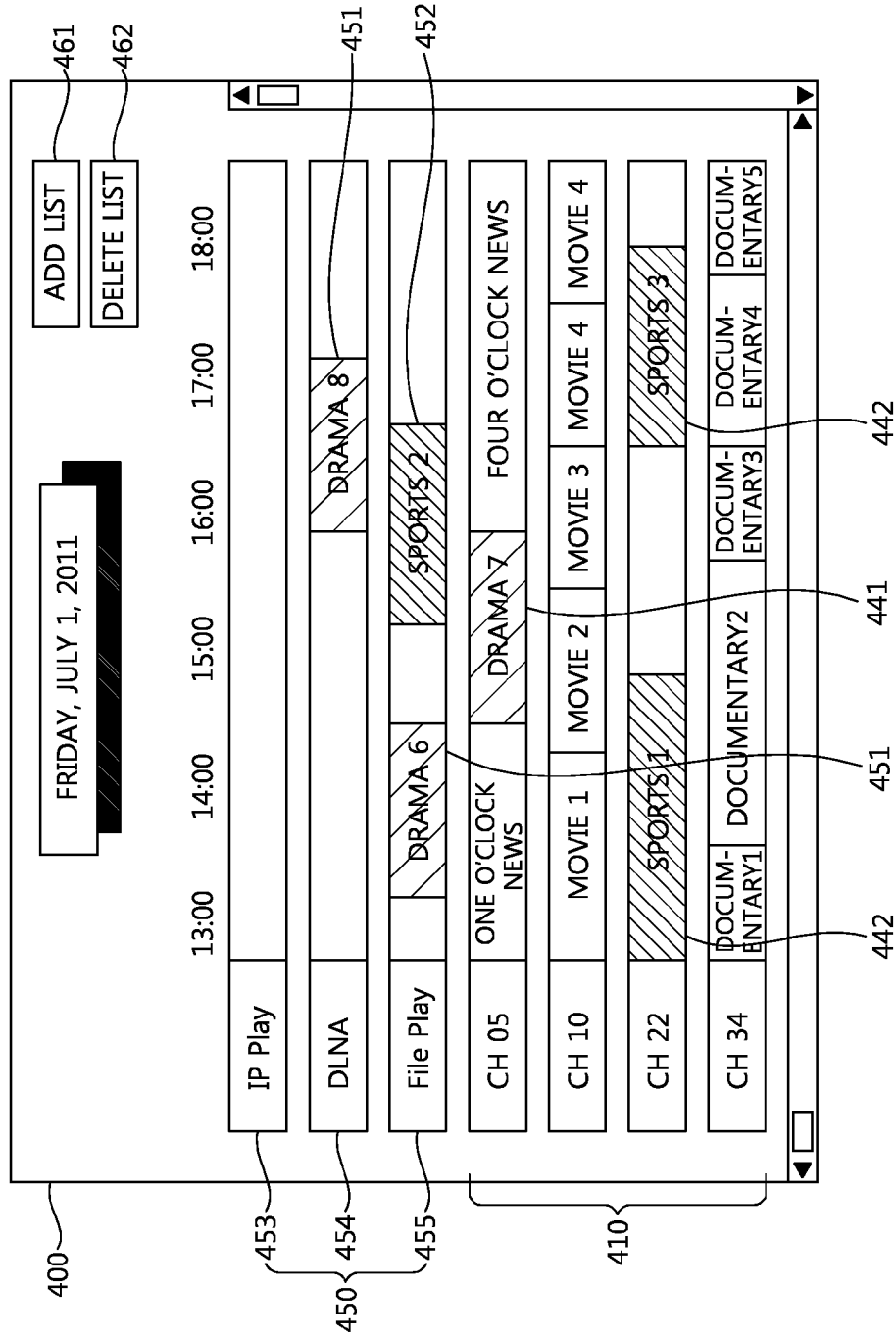
FIG. 4 is a conceptual diagram showing an example in which there are associated local content corresponding to respective channel programs that belong to EPG information of a broadcasting program in the configuration of a content management list according to an embodiment of the present invention.

FIG. 4 is a conceptual diagram showing an example in which there are associated local contents 451 and 452 corresponding to respective channel programs 441 and 442 that belong to EPG information of a broadcasting program in the configuration of a content management list 400 according to an embodiment of the present invention. If there are the associated local contents 451 and 452 corresponding to the respective channel programs 441 and 442, whether any of the plurality of channel programs 441 and 442 has an association with any of the associated local contents 451 and 452 may not be clear. In this case, the content management list 400 may make clear an association between each channel program and each of associated local contents by displaying a specific channel program and specific associated local content, corresponding to the specific channel program, so that they have a common characteristic through a specific indication. For example, the content management list 400 may make clear an association between each channel program and each of associated local contents by displaying the channel program 441 and the associated local content 451 having an association with the channel program 441 in FIG. 4 so that hey have a common characteristic through a specific indication and displaying the channel program 442 and the associated local content 452 having an association with the channel program 442 so that they have a common characteristic through a specific indication. The specific indication may be an indication through graphics and/or text which may include an additional color indication.

Figure 5:
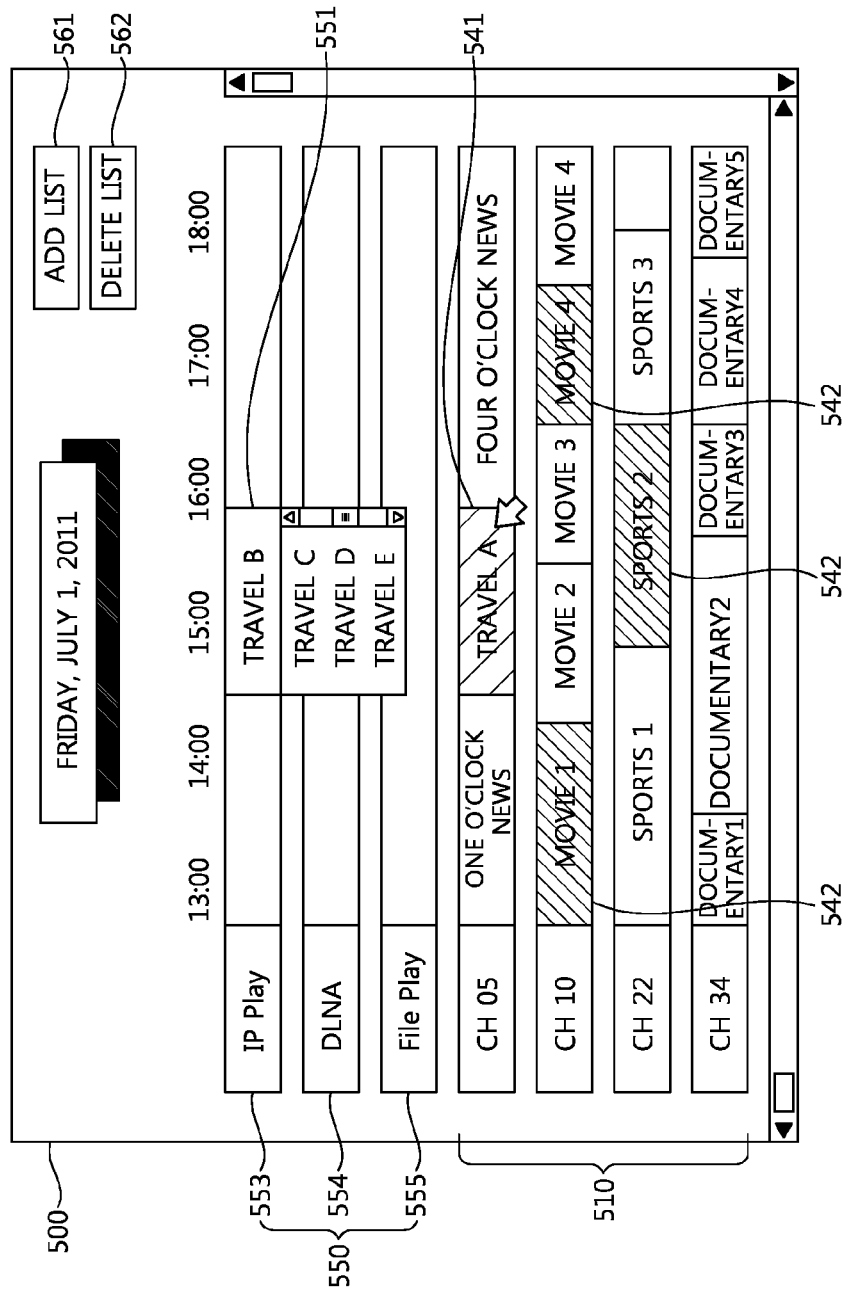
FIG. 5 is a conceptual diagram showing an example in which only associated local content corresponding to a specific channel program is selectively displayed in the configuration of a content management list according to an embodiment of the present invention.

FIG. 5 is a conceptual diagram showing an example in which only associated local content corresponding to a specific channel program is selectively displayed in the configuration of a content management list 500 according to an embodiment of the present invention. If there are associated local contents corresponding to respective channel programs 541 and 542 that belong to program information 510 about each of the channels of multi-channel digital broadcasting provided through digital terrestrial broadcasting or IPTV broadcasting, the content management list 500 may display the channel programs 541 and 542, including the respective associated local contents, in such a way as to be distinguishable from other broadcasting programs, belonging to the program information 510 for each of the channels of multi-channel digital broadcasting, through a specific indication. The specific indication may be an indication through graphics and/or text which may include an additional color indication. Accordingly, there are advantages in that a user can easily check information about the channel programs 541 and 542 including the associated local contents and can view the associated local contents on the desired time because the readability of the channel programs 541 and 542 including the associated local contents is improved.

In the embodiments of the present invention described with reference to FIGS. 1 to 4, information of associated local content may be displayed in an EPG form without special key manipulation of a user in such a way as to have a specific association with the air time of the channel program along the time axis of the content management list. As shown in FIG. 5 showing another embodiment of the present invention, a specific channel program (e.g., 541), from among the channel programs 541 and 542 including the associated local contents, may be specified through a pointer or graphics and/or text that may include an additional color indication in response to an event signal, corresponding to a key control signal generated by the key manipulation of a user, and an associated local content list 551 corresponding to the specified channel program 541 may be displayed in an EPG form in such a way as to have a specific association with the air time of the channel program 541.

In accordance with yet another embodiment of the present invention, the associated local content list 551 corresponding to the specified channel program 541 may be displayed near the specified channel program 541 in a pop-up form without displaying additional local content items 553, 554, and 555. Accordingly, if there are associated local contents corresponding to the respective channel programs 541 and 542, only the associated local content 551 corresponding to the specific channel program 541, from among the channel programs 541 and 542, can be clearly displayed.

Figure 6:
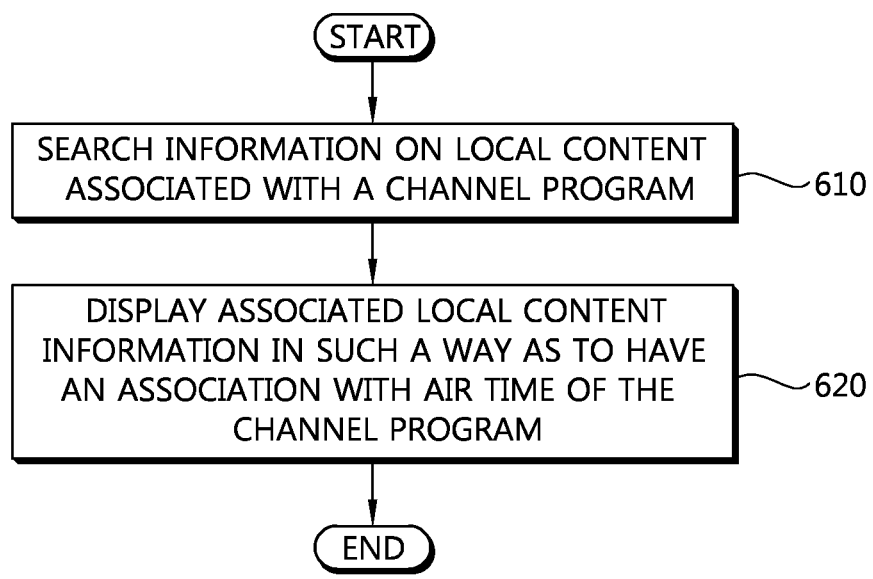
FIG. 6 is a flowchart illustrating a method of providing a content management list according to an embodiment of the present invention.

FIG. 6 is a flowchart illustrating a method of providing a content management list according to an embodiment of the present invention. The content management list providing apparatus which is capable of accessing one or more local contents over a network searches for information of associated local content associated with a channel program included in EPG information of a broadcasting program at step 610 and displays the information of associated local content in such a way as to have an association with the air time of the channel program of the content management list at step 620. Here, displaying the searched information of associated local content in such a way as to have an association with the air time of the channel program may include at least any one of, if the channel program and the associated local content do not have a temporal order relationship, displaying the information of associated local content on the same time as the air time of the channel program along the time axis of the content management list, if the channel program and the associated local content have a temporal order relationship, displaying the information of associated local content anterior or posterior to the air time of the channel program along the time axis of the content management list, and, if the associated local content is plural, generating a list including a plurality of the associated local content and displaying the list.

Figure 7:
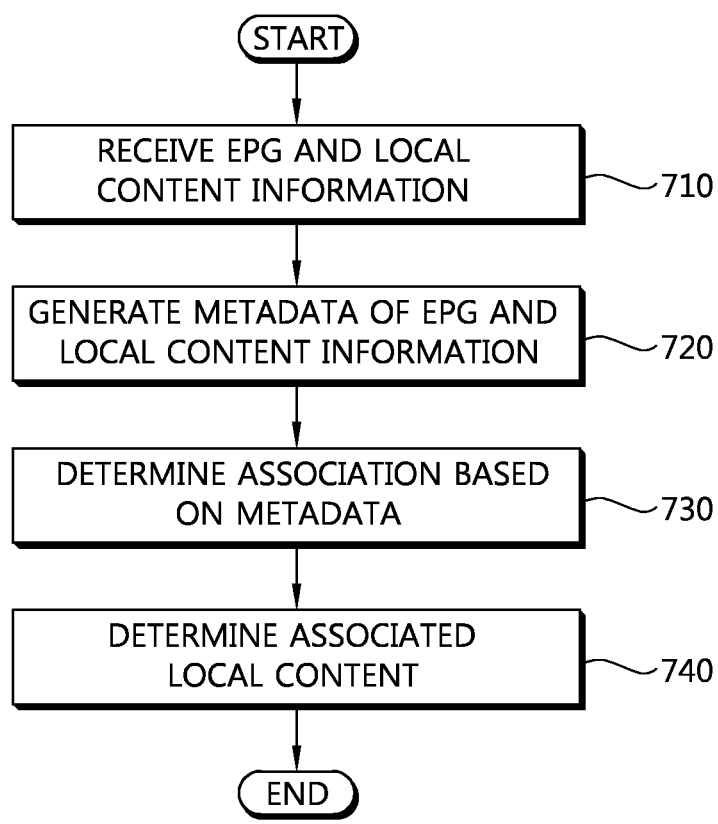
FIG. 7 is a detailed flowchart illustrating searching for information of associated local content associated with a channel program that belongs to EPG information of a broadcasting program in FIG. 6.
Figure 8:
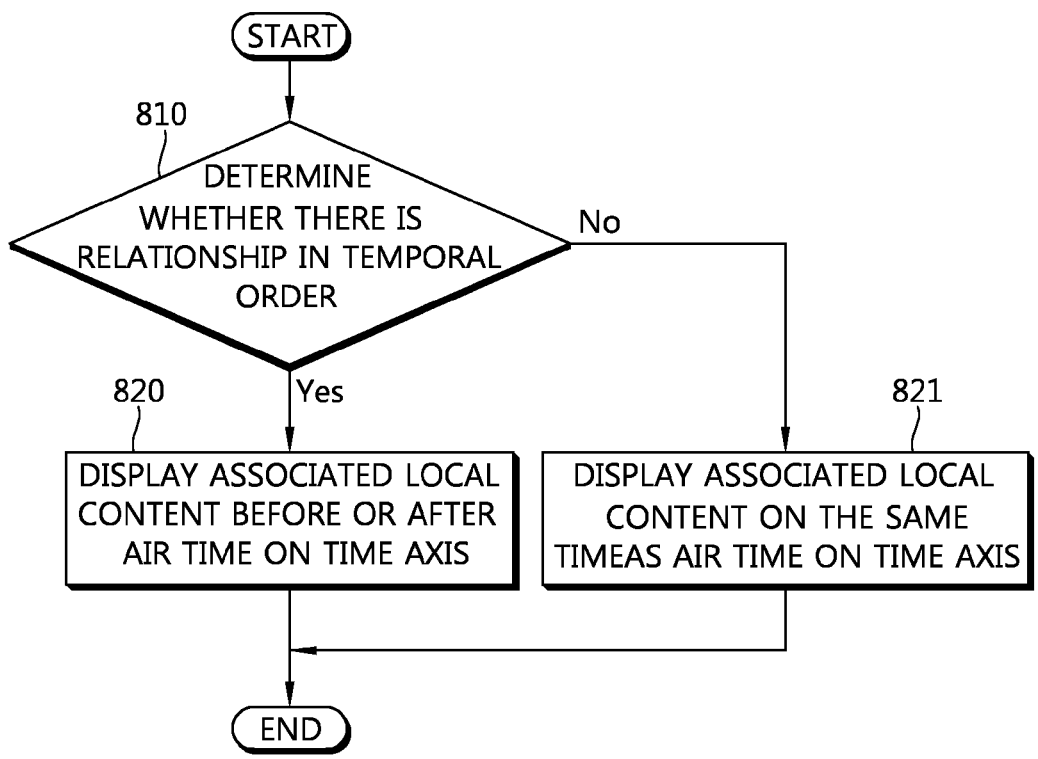
FIG. 8 is a detailed flowchart illustrating displaying searched information of associated local content so that the searched information of associated local content has an association with the air time of the channel program of a content management list in FIG. 6.

FIG. 7 is a detailed flowchart illustrating searching for information of associated local content associated with a channel program that belongs to EPG information of a broadcasting program at step 610 of FIG. 6. FIG. 8 is a detailed flowchart illustrating displaying the searched information of associated local content so that the searched information of associated local content has an association with the air time of the channel program of the content management list at step 620 of FIG. 6. A method of providing a content management list according to an embodiment of the present invention is described below with reference to FIGS. 6 to 8. First, the content management list providing apparatus obtains EPG information of digital terrestrial broadcasting, IPTV broadcasting, or cable TV broadcasting received over a wired and/or wireless network and receives information about local contents, such as contents (File Play) stored in the content management list providing apparatus or stored in the local regions of various devices connected to the content management list providing apparatus over a wired and/or wireless network, contents shared through DLNA (DLNA), and contents (IP Play) that are interconnected or playable over the Internet at step 710.

Next, the content management list providing apparatus generates metadata for a channel program included in the received EPG information and metadata for information about local contents received from various devices at step 720. The metadata may include one or more of a content name, a series name, director, a player, a genre, a subtitle, order, a copyright holder, credit information, a file name, a file position, a file size, a play time, and the type of file so that the channel program and the contents of each of the local contents can be clearly indicated. The metadata for the channel program and the metadata for the information of the local contents may have the same form for the purpose for the integrated management of various contents.

Next, the content management list providing apparatus determines whether the channel program and the one or more local contents have an association or not according to a predetermined criterion by using the generated metadata at step 730. The criteria for determining whether the association exists or not may include a plurality of predetermined criteria so that they may be changed in response to an event signal corresponding to a key control signal generated by the key manipulation of a user. The content management list providing apparatus determines whether the channel program and the one or more local contents have an association or not by using one or more of a content name, a series name, director, a player, a genre, a subtitle, order, a copyright holder, credit information, a file name, a file position, a file size, a play time, and the type of file which are included in the metadata of the channel program and the metadata of local contents. For example, the content management list providing apparatus may compare the metadata of the channel program with the metadata of one or more local contents. If, as a result of the comparison, one or more predetermined metadata elements, for example, a content name, order, and a series name are the criteria or higher, the content management list providing apparatus may determine that the channel program and the one or more local contents have a high association. If each of the metadata elements has a predetermined length or longer, the channel program and the one or more local contents may be recognized as having a high association. Furthermore, the content management list providing apparatus may assign specific weight depending on whether specific metadata elements are identical with each other not when an association is determined.

The content management list providing apparatus may finally determine associated local content on the basis of the determination at step 740. Next, the content management list providing apparatus determines whether the channel program and the determined associated local content have a temporal order relationship at step 810. If the associated local content is determined based on the remaining elements other than order, from among the elements of the metadata, an order relationship between contents may be determined on the basis of the order. If some of the item elements of the metadata, such as a content name and a series name, are identical with each other although an order relationship between contents does not exist, number elements may be detected from item elements that are not identical with each other and used to determine the order relationship between the contents.

If, as a result of the determination at step 810, it is determined that the channel program and the determined associated local content have a temporal order relationship, the content management list providing apparatus displays information of the associated local content in an EPG form before or after the air time of the channel program along the time axis of the content management list at step 820. If, as a result of the determination at step 810, it is determined that the channel program and the determined associated local content do not have a temporal order relationship, the content management list providing apparatus displays information of the associated local content in an EPG form on the same time as the air time of the channel program along the time axis of the content management list at step 821.

In displaying the searched information of associated local content in such a way as to have an association with the air time of the channel program of the content management list at step 620 of FIG. 6, the content management list 200 may display information of the specific associated local content 252 selected by a user, from among the displayed associated local contents, in such a way as to be distinguishable from other contents on the time axis displayed in the content management list as shown in FIG. 2. Furthermore, in displaying the searched information of associated local content in such a way as to have an association with the air time of the channel program of the content management list at step 620 of FIG. 6, if the associated local content is plural as shown in FIG. 3, a list including the plurality of associated local contents may be generated so that an amount of information of associated local content can be displayed and the associated local content list 310 may be displayed through pop-up, as shown in FIG. 3. Furthermore, in displaying the searched information of associated local content in such a way as to have an association with the air time of the channel program of the content management list at step 620 of FIG. 6, if there are the associated local contents 451 and 452 corresponding to the respective channel programs 441 and 442, an association between a channel program and each associated local content may become clear by displaying a specific channel program (e.g., 441) and specific associated local content (e.g., 451) corresponding to the specific channel program 441 through a specific indication so that they have a common characteristic. Furthermore, in displaying the searched information of associated local content in such a way as to have an association with the air time of the channel program of the content management list at step 620 of FIG. 6, if there are associated local contents corresponding to the respective channel programs 541 and 542 as shown in FIG. 5, the channel programs 541 and 542 including the associated local contents may be displayed in such a way as to be distinguishable from other broadcasting programs that belongs to the program information 510 about each of the channels of multi-channel digital broadcasting through a specific indication. Furthermore, as shown in FIG. 5, the associated local content list 551 corresponding to only the specified channel program 541 may be displayed in an EPG form in such a way as to have a specific association with the air time of the channel program 541 or may be displayed in a pop-up form near the specified channel program 541 without displaying the additional local content items 553, 554, and 555.

Meanwhile, the content management list providing apparatus may provide a user interface that enables a user to move a local content item, displayed in a content management list, to desired time on the time axis. For example, the content management list providing apparatus may provide a screen where a content management list may be modified and move a local content item on the time axis in response to an event signal received through key entering, a remocon signal, or drag & drop so that the scheduled play time of relevant local content is moved to the time desired by a user.

In the method of providing a content management list according to the embodiment of the present invention, the method of first displaying a content list according to EPG information of a broadcasting program and then displaying information of associated local content in such a way as to have an association with the air time of a channel program has been described as an example. In some embodiments, local content having an association with a program now being viewed may be independently displayed on the time axis of a content management list without displaying the EPG information.

Figure 9:
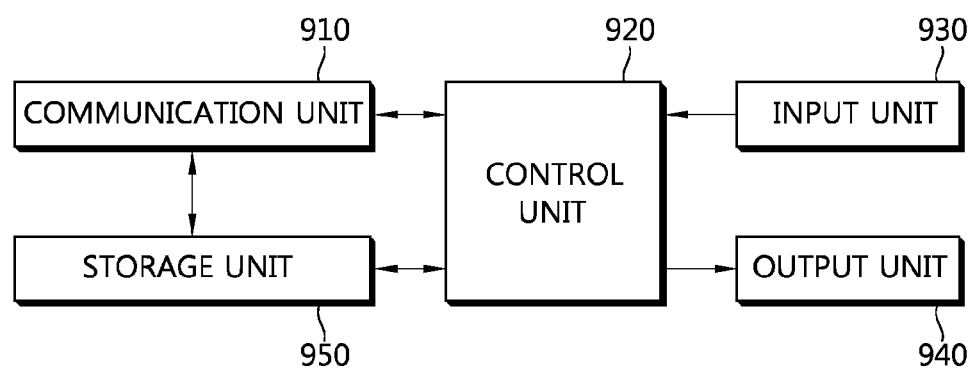
FIG. 9 is a block diagram showing the construction of an apparatus for providing a content management list according to an embodiment of the present invention.

FIG. 9 is a block diagram showing the construction of the content management list providing apparatus according to an embodiment of the present invention. Referring to FIG. 9, the content management list providing apparatus according to the embodiment of the present invention may include a communication unit 910, a control unit 920, an input unit 930, an output unit 940, and a storage unit 950.

The communication unit 910 may include a wired and/or wireless network interface and receives information of the EPG of digital broadcasting, IPTV broadcasting, or cable TV broadcasting over a broadcasting communication network, the Internet, and a wired and/or wireless network that may include mobile communication.

Furthermore, the communication unit 910 receives a local content file and/or information about the local content file from various devices connected to the content management list providing apparatus through any one of the Internet, Wi-Fi, Zigbee, Bluetooth, and a wired and/or wireless network that may include DLNA.

The control unit 920 receives the information of the EPG of digital terrestrial broadcasting, IPTV broadcasting, or cable TV broadcasting through the communication unit 910 and provides a content management list to the output unit 940.

Furthermore, the control unit 920 searches for information of local contents associated with a channel program that belongs to the EPG information on the basis of the EPG information and the information of a local content received from the communication unit 910 and performs control so that the searched information of associated local content is displayed in a display device (not shown) through the output unit 940.

Figure 10:
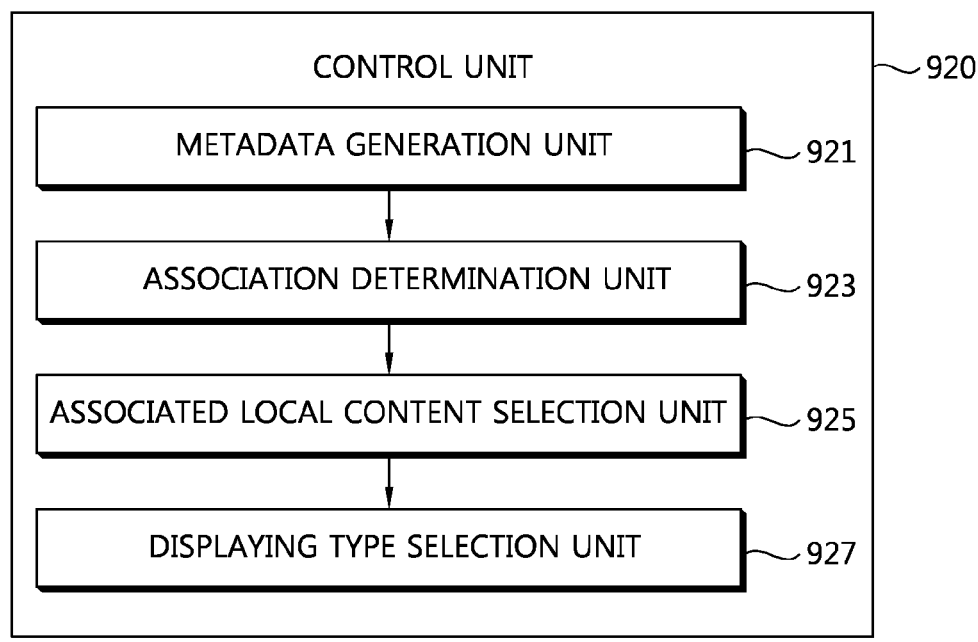
FIG. 10 is a block diagram showing the construction of a control unit in the construction of the apparatus for providing a content management list according to an embodiment of the present invention.

FIG. 10 is a block diagram showing the construction of the control unit 920 in the construction of the content management list providing apparatus according to an embodiment of the present invention. Here, the control unit 920 may include a metadata generation unit 921 for generating metadata for the channel program and the one or more local contents obtained through the communication unit 910, an association determination unit 923 for determining an association between the channel program and the one or more local contents according to a predetermined criterion on the basis of the generated metadata, an associated local content selection unit 925 for selecting information of associated local contents according to a result of the determination for the association, and a display type selection unit 927 for selecting a display type depending on the number of the selected associated local contents and the type of selected associated local content.

The metadata generation unit 921 generates metadata for a channel program included in the received EPG information and metadata for information about the one or more local contents received from various devices. The metadata may include one or more of a content name, a series name, director, a player, a genre, a subtitle, order, a copyright holder, credit information, a file name, a file position, a file size, a play time, and the type of file so that the contents of each of the channel program and the one or more local contents can be clearly indicated. The metadata for the channel program and the metadata for the information of the one or more local contents may have the same form for the purpose of the integrated management of various contents.

Next, the association determination unit 923 determines whether the channel program and the one or more local contents have an association or not according to a predetermined criterion on the basis of the generated metadata. The criteria for determining whether the association exists or not may include a plurality of predetermined criteria so that they may be changed in response to an event signal corresponding to a key control signal generated by the key manipulation of a user. Whether the channel program and the one or more local contents have an association or not may be determined on the basis of one or more of a content name, a series name, director, a player, a genre, a subtitle, order, a copyright holder, credit information, a file name, a file position, a file size, a play time, and the type of file which are included in the metadata. If each of metadata elements has a predetermined length or longer, the channel program and the one or more local contents may be recognized as having an association. Weight may be assigned to each metadata element in determining whether an association exists or not.

The associated local content selection unit 925 may finally determine associated local content according to a result of the determination for the association that has been made by the association determination unit 923.

The display type selection unit 927 determines whether there is a temporal order relationship between the channel program and the determined associated local content or not. If the associated local content is determined on the basis of the remaining elements of her than order, from among the elements of the metadata, an order relationship between contents may be determined on the basis of the order. If some of the item elements of the metadata, such as a content name and a series name, are identical with each other although an order relationship between contents does not exist, number elements may be detected from item elements that are not identical with each other and used to determine the order relationship between the contents.

If it is determined that the channel program and the associated local content do not have a temporal order relationship, the display type selection unit 927 may display information of the associated local content in an EPG form on the same time as the air time of the channel program along the time axis of the content management list as shown in FIG. 1. If it is determined that the channel program and the associated local content have a temporal order relationship, the display type selection unit 927 may display information of the associated local content before or after the air time of the channel program along the time axis of the content management list as show in FIG. 2.

If the associated local content is plural, the display type selection unit 927 may generate a list including a plurality of the associated local content and display the list as shown in FIG. 3. For example, if the associated local content is plural, the display type selection unit 927 may classify a plurality of associated local contents according to their types, display each of the content types as a separate local content item as shown in FIG. 1, and display the associated local contents in such a way as to have an association with the air time of the channel program along the time axis of each of the local content items. Furthermore, the display type selection unit 927 may display information of the specific associated local content 252 selected by a user, from among the displayed associated local contents, in such a way as to be distinguishable from other contents on the time axis displayed in the content management list as shown in FIG. 2. For another example, if the associated local content is plural as shown in FIG. 3, the display type selection unit 927 may generate a list including a plurality of associated local contents so that an amount of information of associated local content can be displayed and display the associated local content list 310 through pop-up as shown in FIG. 3. Furthermore, if there are the associated local contents 451 and 452 corresponding to the respective channel programs 441 and 442 as shown in FIG. 4, the display type selection unit 927 may display the specific channel program 441 and the specific associated local content 451, corresponding to the specific channel program 441, through a specific indication so that they have a common characteristic in order to make clear an association between each channel program and each associated local content. For example, if there are associated local contents corresponding to the respective channel programs 541 and 542 as shown in FIG. 5, the display type selection unit 927 may display the channel programs 541 and 542 including the respective associated local contents in such a way as to be distinguishable from other broadcasting programs that belong to the program information 510 for each of the channels of multi-channel digital broadcasting through a specific indication, display only the associated local content list 551, corresponding to the specified channel program 541, in an EPG form by using graphics and/or text that may include a point in such a way as to have a specific association with the air time of the channel program 541 as shown in FIG. 5, or display only the associated local content list 551 near the specified channel program 541 in a pop-up form without displaying the additional local content items 553, 554, and 555.

Furthermore, the control unit 920 deletes schedule information of a broadcasting program or content, scheduled through the input unit 930, from a content management list in response to a key event that instructs the cancellation or deletion of the schedule.

The input unit 930 may be formed of at least one key or may be formed of an RF, infrared, or Bluetooth module for receiving a control signal provided from a remote controller. The input unit 930 provides the control unit 920 with an even signal corresponding to a key control signal generated by the key manipulation of a user.

The output unit 540 may be formed of a video processing module and/or an audio output module for controlling a display device. The output unit 540 processes an image signal in response to control of the control unit 920 and provides the processed signal to a display device connected thereto.

The storage unit 950 stores an EPG and a broadcasting program and/or content schedule information selected by a user in response to control of the control unit 920. Furthermore, the storage unit 950 may store a content file and/or content information in response to control of the control unit 920.

In accordance with the method of providing a content management list including associated media and the apparatus for performing the same, not only pieces of information about the EPG of a digital terrestrial broadcasting, IPTV broadcasting, or cable TV broadcasting program, but also pieces of information about content having a high association with content included in EPG information, from among contents stored in devices over a wired and/or wireless network, contents shared through DLNA, and contents playable over the Internet may be integrated in an EPG form and displayed in an EPG form so that they have an association.

The present invention is different from the prior art document in that contents (e.g., contents stored in devices over a wired and/or wireless network, contents shared through DLNA, and contents playable over the Internet) other than broadcasting content are displayed a schedule list form near the air time zone of a broadcasting channel associated with the contents. That is, the Patent Document 1 of the Prior Art Document is advantageous in that content may be more easily selected because a broadcasting program list and an image file list are displayed so that they can be checked at once. In contrast, in the present invention, a broadcasting program list and contents (e.g., contents stored in devices over a wired and/or wireless network, contents shared through DLNA, and contents playable over the Internet) other than playable broadcasting content are not displayed at once, but local contents associated with a channel program that is being broadcasted in a specific time zone on EPG information, together with a schedule list, is displayed near the time zone of the channel program. Accordingly, the present invention is advantageous in that a user may easily recognize relevant contents stored in the local regions while viewing a channel program and view the relevant content on the relevant time.

Accordingly, a user can plan to use various contents more efficiently without the need to search for all available contents in order to directly check associated content and use the associated content.

While the invention has been shown and described with respect to the preferred embodiments, it will be understood by those skilled in the art that various changes and modifications may be made without departing from the spirit and scope of the invention as defined in the following claims.

What is claimed is:

1. A method of providing a content management list including associated media, performed by a content management list providing apparatus capable of accessing one or more local contents over a network, the method comprising:
    searching for information of at least one associated local content associated with a channel program included in Electronic Program Guide (EPG) information of a broadcasting program;
    determining a common indication between the at least one associated local content and the channel program, and identifying a play time of the at least one associated local content to associate the identified play time with air time of the channel program of the content management list;
    displaying the searched information of the at least one associated local content in such a way that the identified play time of the at least one associated local content has an association with air time of the channel program; and
    as a result of the determined common indication, highlighting differently the at least one associated local content having the associated play time with the air time of the channel program, in comparison to another associated local content with a play time having an association with air time of another channel program.

2. The method as claimed in claim 1, wherein searching for the information of the at least one associated local content associated with a channel program included in Electronic Program Guide (EPG) information of a broadcasting program comprises:
    generating metadata for the channel program and metadata for the one or more local contents;
    determining whether the channel program and the one or more local contents have an association according to a predetermined criterion based on the generated metadata; and
    selecting the searched information of the associated local content according to a result of the determination.

3. The method as claimed in claim 1, wherein displaying the searched information of the at least one associated local content in such a way that the identified play time of the at least one associated local content has an association with air time of the channel program comprises displaying the searched information of the at least one associated local content in an EPG form on a time identical with the air time of the channel program of the content management list, if the channel program and the at least one associated local content do not have a temporal order relationship.

4. The method as claimed in claim 1, wherein displaying the searched information of the at least one associated local content in such a way that the identified play time of the at least one associated local content has an association with air time of the channel program comprises displaying the searched information of the at least one associated local content in an EPG form before or after the air time of the channel program of the content management list, if the channel program and the at least one associated local content have a temporal order relationship.

5. The method as claimed in claim 1, wherein displaying the searched information of the at least one associated local content in such a way that the identified play time of the at least one associated local content has an association with air time of the channel program comprises:
    generating a list including a plurality of the associated local contents; and
    displaying the generated list in such a way as to have an association with the air time of the channel program of the content management list.

6. The method as claimed in claim 1, wherein displaying the searched information of the at least one associated local content in such a way that the identified play time of the at least one associated local content has an association with air time of the channel program comprises:
specifying a specific channel program, from among channel programs having associated local content, in response to an event signal corresponding to a key control signal generated by a key manipulation of a user, and
displaying an associated local content list, corresponding to the specified channel program, in such a way as to have a specific association with the air time of the channel program.

7. The method as claimed in claim 1, wherein the content management list displays associated local content for at least one content of a content stored in the content management list providing apparatus, a content stored in one or more devices connected to the content management list providing apparatus over a network, a content interconnected through Digital Living Network Alliance (DLNA), and a content playable over an Internet.

8. A content management list providing apparatus, comprising:
a communication unit for receiving Electronic Program Guide (EPG) information and information of one or more local contents over a wired or wireless network and providing the received information; and
a control unit configured to:
search for information of at least one associated local content associated with a channel program included in to the EPG information of a broadcasting program,
determine a common indication between the at least one associated local content and the channel program, and identify a play time of the at least one associated local content to associate the identified play time with air time of the channel program of the content management list,
control an output unit to output the searched information of at least one associated local content is displayed in such a way that the identified play time of the at least one associated local content has an association with air time of the channel program, and
as a result of the determined common indication, control the output unit to highlight differently the at least one associated local content having the associated play time with the air time of the channel program, in comparison to another associated local content with a play time having an association with air time of another channel program.

9. The content management list providing apparatus as claimed in claim 8, wherein the control unit comprises:
a metadata generation unit for generating metadata for the channel program and the one or more local contents obtained through the communication unit;
an association determination unit for determining whether the channel program and the one or more local contents have an association according to a predetermined criterion based on the generated metadata; and
an associated local content selection unit for selecting information of the associated local content according to a result of the determination.

10. The content management list providing apparatus as claimed in claim 8, wherein:
the control unit comprises a display type selection unit for selecting a display type of the searched information of the at least one associated local content, and
if the channel program and the at least one associated local content do not have a temporal order relationship, the display type selection unit displays the searched information of associated local content in an EPG form on a time identical with the air time of the channel program of the content management list.

11. The content management list providing apparatus as claimed in claim 8, wherein:
the control unit comprises a display type selection unit for selecting a display type of the searched information of the at least one associated local content, and
if the channel program and the at least one associated local content have a temporal order relationship, the display type selection unit displays the searched information of the at least one associated local content in an EPG form before or after the air time of the channel program of the content management list.

12. The content management list providing apparatus as claimed in claim 8, further comprising
an input unit for providing an event signal corresponding to a key control signal generated by a key manipulation of a user,
the control unit comprises a display type selection unit for selecting a display type of the at least one associated local content, and
the display type selection unit specifies a specific channel program, from among channel programs including at least one associated local content, in response to the event signal and displays an associated local content list, corresponding to the specified channel program, in such a way as to have a specific association with the air time of the channel program.

13. The content management list providing apparatus as claimed in claim 8, wherein the associated local content is associated local content for at least one content of a content stored in the content management list providing apparatus, a content stored in one or more devices connected to the content management list providing apparatus over a network, a content interconnected through Digital Living Network Alliance (DLNA), and a content playable over an Internet.

* * * * *